W. H. Harrison,
Hanging Saws,
№ 17,823. Patented July 14, 1857.
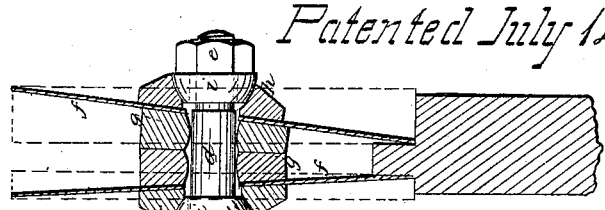
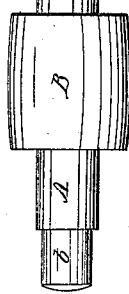
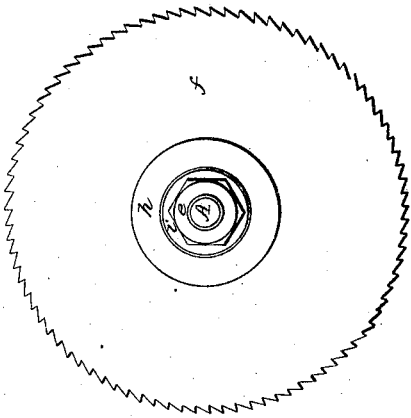
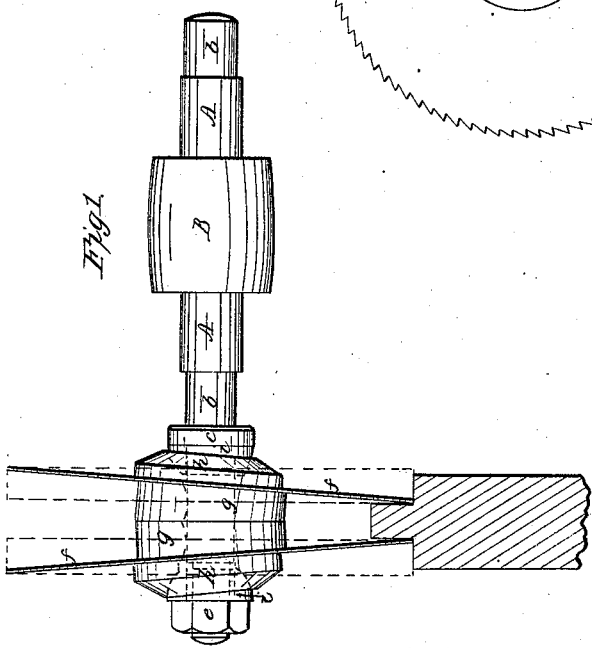
Witnesses:
Sam'l L. C. Welsh
Theodor Bergner
Inventor:
William H. Harrison

UNITED STATES PATENT OFFICE.

WILLIAM H. HARRISON, OF PHILADELPHIA, PENNSYLVANIA.

MODE OF CUTTING TENONS BY TWO CIRCULAR SAWS OBLIQUE TO SHAFT.

Specification of Letters Patent No. 17,823, dated July 14, 1857.

*To all whom it may concern:*

Be it known that I, WILLIAM H. HARRISON, of the city of Philadelphia and State of Pennsylvania, have invented a new and Improved Mode of Cutting Tongues of Various Sizes by Adjustable Obliquely-Set Circular Saws; and I do hereby declare that the following is a full, clear, and exact description of the same, reference being had to the accompanying drawing and to the figures and letters of reference marked thereon.

My invention consists in securing two obliquely-set circular saws to their spindle in the following manner: The two saws, between which are confined two beveled washers, (either of which can be turned around independently of the other) are clamped between two plain washers, fitting loosely on the spindle. These washers are each provided with a concave recess for receiving corresponding convex washers, one of which bears against a collar on the spindle, while a nut, screwing onto the end of the spindle presses against the other, thus securing the saws in their required position.

The desired thickness of the tongue to be cut is obtained by the relative position of the two washers between them, while the obliquity of the two saws to the axis of the spindle can be so varied by means of the concave and convex washers, that by giving one saw more throw than the other, the tongue may as easily be formed on one side of the stuff, as directly in the center.

On reference to the drawing, which forms a part of this specification and in which the same letters of reference allude to similar parts throughout the several views: Figure 1 is an elevation of the saws, washers and spindle, showing both saws of the same obliquity to the axis, for cutting a tongue in the center of the stuff. Fig. 2, is a similar view, showing the beveled and concave washers in section and a difference in the obliquity of the two saws, which are thus adapted for forming the tongue more to one side of the stuff. Fig. 3 is a face view of the end saw, washers and nut.

A is the spindle, and B the pulley, on which runs the driving-belt.

*b, b*, are the journals.

Beyond the collar *c*, which is forged and turned to the spindle, extends the plain part *d*, (Fig. 2,) on the outer end of which is cut a screw for receiving the tightening nut *e*.

*f, f*, are the saws, and *g, g*, the beveled washers between them. Outside of the saws are the washers *h, h*, which bear flat against the saws and have concave recesses turned into them for receiving the convex rings *i, i*.

On the greater or less thickness and bevel of the washers *g, g*, depends the thickness of stuff, for the working of which the saw is adapted, while the narrowest width of space between the two blades gives the thickness of the tongue. This space can be varied by changing the relative position of the two beveled washers *g, g*, and will be the least, when the thinnest parts of both washers are placed so as to coincide with each other. In addition to the regulating of the thickness of tongue, the relative obliquity of the saws to the axis of the spindle can by means of the concave washers *h, h*, and rings *i, i*, be made such, that one saw will stand more oblique than the other, thus admitting the cutting away of more wood on one side of the tongue, than is done on the other (as seen at Fig. 2.)

Being well aware, that one oblique circular saw and the employment of two beveled washers between a fixed collar and the saw are claimed in the patent of Amos D. Highfield, (assigned to him and myself) I wish it to be understood, that I do not claim any such device in this application, but What I do claim as new, and desire to secure by Letters Patent, is—

The use of two circular saws upon the same shaft, when their planes form an acute angle with each other, and made adjustable on their shaft by means substantially such as herein set forth.

WILLIAM H. HARRISON.

Witnesses:
SAML. L. C. WELSH,
THEODORE BERGNER.